US012269722B2

(12) United States Patent
Stoiber

(10) Patent No.: US 12,269,722 B2
(45) Date of Patent: Apr. 8, 2025

(54) METHOD FOR OPERATING A MEANS OF TRANSPORT

(71) Applicant: SCHILLER AUTOMATISIERUNGSTECHNIK GMBH, Osterhofen (DE)

(72) Inventor: Peter Stoiber, Regen (DE)

(73) Assignee: Schiller Automatisierungstechnik GmbH, Osterhofen (DE)

( * ) Notice: Subject to any disclaimer, the term of this patent is extended or adjusted under 35 U.S.C. 154(b) by 0 days.

(21) Appl. No.: 18/684,289

(22) PCT Filed: Aug. 11, 2022

(86) PCT No.: PCT/EP2022/072590
§ 371 (c)(1),
(2) Date: Feb. 16, 2024

(87) PCT Pub. No.: WO2023/020940
PCT Pub. Date: Feb. 23, 2023

(65) Prior Publication Data

US 2024/0262664 A1 Aug. 8, 2024

(30) Foreign Application Priority Data

Nov. 11, 2021 (EP) .................................... 21207741

(51) Int. Cl.

| | |
|---|---|
| ***B66F 9/07*** | (2006.01) |
| ***B66F 9/06*** | (2006.01) |
| ***B66F 9/075*** | (2006.01) |
| ***B66F 17/00*** | (2006.01) |
| ***G08G 1/16*** | (2006.01) |

(52) U.S. Cl.
CPC ............ *B66F 9/0755* (2013.01); *B66F 9/063* (2013.01); *B66F 17/003* (2013.01); *G08G 1/16* (2013.01)

(58) Field of Classification Search
CPC ...... B66F 9/0755; B66F 9/063; B66F 17/003; G08G 1/16
See application file for complete search history.

(56) References Cited

U.S. PATENT DOCUMENTS

| | | | |
|---|---|---|---|
| 4,266,106 A | 5/1981 | Fraser et al. | |
| 2008/0011554 A1 | 1/2008 | Broesel et al. | |
| 2020/0031642 A1* | 1/2020 | Uchimura ............ | B62D 15/029 |

FOREIGN PATENT DOCUMENTS

| | | |
|---|---|---|
| BE | 1018160 A3 | 6/2010 |
| DE | 102004047209 A1 | 3/2006 |
| EP | 2385014 A1 | 11/2011 |
| EP | 3312131 A1 | 4/2018 |
| FR | 2677006 A1 | 12/1992 |

* cited by examiner

*Primary Examiner* — Yufeng Zhang
(74) *Attorney, Agent, or Firm* — Wood, Phillips, Katz, Clark & Mortimer

(57) ABSTRACT

A method for operating a conveying device (1), such as a truck or a forklift, which is equipped with a transport device (6) for transporting an object (2), includes the following steps: i) arranging an object (2) in an arrangement region (15) of the transport device (6); ii) contactless measurement (53) of the object (2) using a distance measurement apparatus (10); iii) determining a safety zone (30) at the conveying device (1) as a function of the measurement (53) according to step ii).

14 Claims, 4 Drawing Sheets

1.5
36
7.1
7
7.2
16
10.11
8
6
3
36
4.1
12
4.1
15
4
2
7.3
13
14

METHOD FOR OPERATING A MEANS OF TRANSPORT

FIELD OF THE INVENTION

The present invention relates to a method for operating a means of transport equipped with a transport device.

BACKGROUND OF THE INVENTION

The means of transport can, for example, be a truck that is used in a goods logistics facility. There, the means of transport can place the goods, i.e. different objects, on the shelves or retrieve them from them. For this purpose, the means of transport is equipped with a transport device in which the respective object is arranged during transport from or to a shelf. In the case of a forklift truck, for example, this can be the lifting frame with fork carriage and fork arms, which illustrates a preferred field of application, but is not intended to limit the subject matter in its generality.

BRIEF SUMMARY OF THE INVENTION

The present invention relates to the technical problem of providing an advantageous method for operating a means of transport with a transport device.

This is solved by the method according to claim 1, namely a determination or adaptation of a safety zone of the means of transport in dependance of a contactless measurement of the object. Thus, for example, in the case of a large object that has a projection relative to the means of transport, the safety zone of the means of transport can be enlarged so that predefined minimum distances are maintained despite the projection. To illustrate, in the case of the truck, for example, a lateral minimum distance taken perpendicular to the main direction of travel is $d_{min}$, in the case of an object with a lateral projection, a larger distance $d_a > d_{min}$ is set. The safety zone, which is used as the basis for semi-autonomous driver assistance or, in particular, fully autonomous driving, is then correspondingly larger.

Preferred embodiments are provided in the dependent claims and the entire disclosure, whereby a distinction is not always made between aspects of the method and aspects of use or also of the device; in any case, the disclosure is to be understood implicitly with regard to all categories of claims. If, for example, a means of transport suitable for a particular method or application is described, this is also to be understood as a disclosure of a corresponding operating method or the corresponding use, and vice versa.

In general, the contactless measurement is carried out with a distance measuring device, wherein in a preferred embodiment a segmented scanning area is detected with this device. A specific feature here is not the subdivision into segments per se, but rather a “free or occupied” evaluation of the status in the respective segment. The segmentation can be significantly coarser than the resolution of the distance measuring device, so a respective segment can, for example, comprise several pixels or voxels. If the object reaches into the respective segment, regardless of whether it fills it completely or only partially, the “occupied” status is determined for this segment.

A respective segment, on the other hand, is classified as “free” if the object does not reach into it. Across the scan field, this can result in occupied segments in a centre area, for example, or at other exposed locations (see below in detail), and free segments in edge areas, for example. To determine or adapt the safety zone, a projection is then determined that an occupied segment has in relation to the means of transport, and this projection is added to an original safety zone, i.e. to the minimum distance $d_{min}$ mentioned above. For this purpose, the projections of all occupied segments can be determined, for example, and the maximum value can then be used as a basis, but segments located further inwards can also be sorted out in advance, for example, and the respective projection can be determined only for the outer or outermost occupied segments.

To summarize in simple terms, the approach is not to image the object with the distance measurement, but to detect it via the segments in a comparatively coarser grid. A certain granularity is therefore accepted, which conversely increases the reliability of the “free” or “occupied” assignment. To illustrate this, even if one of the pixels or voxels in the segment is faulty, i.e. not correctly detected, the remaining pixels/voxels could still ensure that the segment as a whole is detected as “occupied”. This means that slightly more projection is added, e.g. if the object only fills an “inner” area, i.e. the area proximal to the means of transport, of the segment used as the basis for determining the safety zone. However, this granularity can increase safety compared to a contour-accurate imaging of the object, which would avoid adding more projection.

In general, the reference to a “scanning area” should not exclude an overall three-dimensional scanning region; the distance measuring device can therefore also have a resolution at an angle or perpendicular to the scanning area. In the sum, there can be several offset scanning areas, for example, which can each correspond to one line in a matrix-shaped pattern. On the other hand, however, as discussed below with reference to the preferred distance measuring device, there may alternatively be also only exactly one scanning area; scanning can therefore also take place exclusively within one row, i.e. along one line. Irrespective of these details, the scanning area spanned by the distance measuring device can preferably be flat, i.e. lie in a plane.

In general, the distance measuring device is preferably set up for a time-of-flight-based distance measurement using electromagnetic pulses. For the time-of-flight measurement, pulses are emitted across the scanning area, which are reflected partly back to the distance measuring device at the surface of the object. If a pulse is emitted, for example, at a time to and the echo pulse is detected at a later time $t_1$, the distance $d = \Delta t_A c/2$ can be calculated from the flight time $\Delta t_A = t_1 - t_0$ (where c is the speed of light). Preferably, the distance measuring device can be a laser scanner whose laser pulses are emitted sequentially in different spatial directions, i.e. along mutually tilted beams that span the scanning area (“beams” are geometric elements here and specify the lines along which the pulses are emitted). This emission along the mutually tilted beams can be achieved, for example, by pulse guidance via an oscillating or rotating reflector of the distance measuring device.

Regardless of this specific technical implementation, the distance measuring device spans the scanning area with its solid angle resolution, i.e. with mutually tilted spatial directions or beams. In general, it can also be designed to be sensitive to the spatial angle, i.e. echo pulses coming from the different spatial directions can be assigned to the different spatial directions in a receiver unit of the distance measuring device (e.g. via an optical system that directs echo pulses coming from different spatial directions to different areas of a sensor surface). However, as already mentioned, a spatial angle-selective emission, e.g. via a corresponding reflector, is preferred.

In general, the scanning area is positioned so that it intersects the arrangement region, i.e. also the object arranged there. The "object" is the entire object picked up and transported, so it can include, for example, both the goods themselves and a means of storage and/or transport, such as a container or, in particular, a pallet. In relation to a stationary coordinate system, the scanning area can generally also be vertical, meaning that, for example, height protrusions can be determined with regard to underpasses, etc. Preferably, the scanning area is at least partially horizontal, i.e. a lateral projection is determined; particularly preferably, it is parallel to the horizontal directions of the stationary coordinate system.

According to a preferred embodiment, the scanning area is significantly smaller than the range of the distance measuring device, i.e. it is oversized to a certain extent. In detail, the range is considered at the highest angular resolution of the distance measuring device, i.e. at the smallest angular distance between the beams. In the case of a selective emission into different spatial directions, the range can then be determined, for example, by the scanning frequency (e.g. the frequency of the rotating or oscillating reflector), i.e. by the time for which an echo pulse from a specific spatial direction is waited for before a subsequent pulse is emitted in a different spatial direction.

Remaining below the maximum range can increase safety, e.g. the probability of detection of only weakly reflective surface areas. In detail, the extension of the scanning area in a respective direction, e.g. along a respective beam, can, for example, account for a maximum of 50% of the range of the distance measuring device taken in this direction (along this beam). Further upper limits can be, for example, 40% or 30%. Lower limits result less from technical and more from economic considerations; examples include values of at least 1%, 2%, 3%, 4% and 5%. In general, the scanning area as a whole is considered here, i.e. the total of all segments evaluated with the "free or occupied" criterion.

According to a preferred embodiment, the scanning area is relatively small, namely its average extension is at most 3 m, further and particularly preferably at most 2.5 m and 2 m respectively. In detail, the extension of the scanning area is taken from the distance measuring device in a respective spatial direction (along a respective beam) and an average value of the extensions taken along all beams is considered. Possible lower limits of the average extension can be at least 0.5 m or 1 m, for example.

According to a preferred embodiment, the scanning area is subdivided into a total of at most 512 segments; further advantageous upper limits are, in order of preference, at most 512, 256, 128 or 64 segments. This comparatively limited number in turn illustrates the granularity already discussed; the angular resolution of the distance measuring device can, for example, be at least 2, 4 or 8 times larger (upper limits are again of a more economic nature, they can be at most 64 or 32 times). Vice versa, the scanning area can be divided into a total of at least 4, 8 or 16 segments, for example, so that a certain resolution is achieved despite the desired granularity, i.e. there is not an arbitrary amount of additional projection.

In a preferred embodiment, the segments are sectors of a circle whose common centre is located on the distance measuring device. The sectors of a circle fan out or span the scanning area, i.e. they are arranged next to each other with respect to a scanning direction, for example. Neighbouring sectors of a circle can be disjoint or preferably also lie next to each other with a certain overlap (which applies to the segments in general, regardless of the specific design as sectors of a circle).

According to a preferred embodiment, the sectors of a circle have at least in groups different radii (taken from the distance measuring device). This means that at least some of the segments may differ in their radii, but they may also have the same radii within certain groups, for example. For example, the radii can be smaller in a centre area and larger at the edges.

In general, process step iii) and/or the determination of the "free"/"occupied" status can be computer-aided, i.e. it can be a computer-implemented process step. This can generally also be outsourced, e.g. in a central control unit of the goods logistics system or generally also cloud-based; however, local evaluation, i.e. in a computer unit assigned to the means of transport, is preferred. This can, for example, be designed as an ASIC or, in particular, as a microcontroller. Insofar as the present disclosure generally refers to the means of transport being "configured" for certain processes or a certain procedure, this means in particular that commands are stored in a computer unit (globally or preferably locally) which initiate the execution of the corresponding process steps.

According to a preferred embodiment, the distance measuring device is a safety laser scanner equipped with an integrated computer unit. This integrated computer unit is then preferably used to determine the respective "free" or "occupied" status for the respective segments. As the laser scanner is classified as "safe" overall, the evaluation in its integrated computer unit also fulfils this criterion, meaning that the resulting "free"/"occupied" result matrix is also safe. As it is based on a certified measurement and evaluation, the projection determined in this way can also be used, for example, as the basis for a partially or, in particular, fully autonomous driving (whereby, for example, DIN EN ISO 3691-4:2020 on safety distances is satisfied). The original safety zone, i.e. the original safety distance, can be derived from such a standard; the safety laser scanner then provides the "safe" projection, which is added.

The safety zone can preferably be determined in a safety controller (safety PLC), which is connected directly to an output of the safety laser scanner, for example (and receives the "free"/"occupied" states from there). In general, "safe" preferably means that at least performance level (PL) d is satisfied (e.g. defined in accordance with EN ISO 13849). For example, the safety laser scanner can be of type 3 according to IEC 61496 or category 3 according to EN ISO 13849. Irrespective of these details, at least one further (separate) safety laser scanner can preferably be provided on the means of transport to safeguard the driving ("travelling laser scanner"), which is particularly preferably of the same design as the safety laser scanner used to determine the projection. For example, a total of at least two travelling laser scanners and (independently of this) no more than five or four travelling laser scanners can be provided. The safety laser scanner for determining the safety zone is preferably not used to safeguard the driving.

As already mentioned, the invention also relates to a means of transport with a transport device, in particular an industrial truck, the transport device of which preferably comprises a lifting device. Although the method can generally also be executed with an external distance measuring device, the means of transport is preferably equipped with the distance measuring device. The distance measuring device is positioned and orientated in such a way that its scanning area intersects the arrangement region. Due to the integral design of the distance measuring device as part of the means of transport, this can be achieved regardless of its orientation or direction of travel (the arrangement region is always reliably detected).

Preferably, the transport device has a lifting device with which the arrangement region can be brought to different height positions. In general, this can be, for example, a height-adjustable platform with a scissor mechanism, but preferably it has a fork carriage with fork arms, whereby the fork carriage is guided on a mast in a height-adjustable manner. The industrial truck can therefore be designed as a forklift truck with which the object can be removed from raised shelves, for example, in particular a fully autonomous forklift truck. The different height positions are at different geodetic heights; the height can in particular be taken as the vertical distance from a floor of the goods logistics equipment (on which, for example, the industrial truck travels and moves horizontally).

Regardless of these details, in a preferred embodiment, the distance measuring device is arranged on the lifting device so that it can be moved to the different height positions together with the arrangement region. Accordingly, the scanning area intersects the arrangement region in the different height positions, preferably always at the same point. This means that the object can be measured, for example, during or before it is removed from a shelf, which can also be advantageous in terms of time, for example. In the case of the forklift truck, the distance measuring device can, for example, be arranged in a fixed position on the fork carriage or relative to it and consequently be moved in height simultaneously with the fork arms.

In general, the transport device preferably has fork arms with which, for example, a pallet (transport pallet) with the goods on it, such as a Europool pallet, can be picked up in the application. The fork arms can be inserted horizontally between the feet of the pallet and the pallet can then be lifted. In a preferred embodiment, the distance measuring device is positioned in such a way that the scanning area is below the fork arms. For example, it can be mounted on the fork carriage, i.e. the laser scanner can be attached there in a vertical position below the fork arms. Irrespective of these details, the scanning area is preferably parallel to a plane spanned by the fork arms, specifically their upper sides (the object picked up rests on the upper sides, so its contact surface is then in the plane). The scanning area is preferably at most 8 cm, further and particularly preferably at most 7 cm or 6 cm below the plane spanned by the fork arms. Possible minimum distances are, for example, 1 cm or 2 cm.

The correspondingly positioned scanning area then intersects, for example, the feet of the pallet picked up, so the size of the pallet and/or its position on the fork arms can be used to determine the projection. For example, pallets of different sizes can be used, whereby these are dimensioned depending on the respective goods in such a way that the goods are always smaller or at most the same size as the pallet, so that the horizontal dimension of the pallet determines the horizontal dimension of the object (pallet and goods). If the goods are positioned on pallets without overhang, these pallets can also be placed next to each other on a shelf, for example. The measurement of the pallet feet can provide reproducible and reliable projection data, e.g. due to the relatively simple geometry, which reduces the risk of errors.

According to a preferred embodiment, the transport device has a stop sensor which is used to measure whether the object is positioned in the arrangement region. For this purpose, the stop sensor can generally also measure, for example, the vertical support of the object, e.g. the pallet on the fork arm(s). Preferably, however, the stop sensor measures a horizontal contact, e.g. of the object on the fork carriage. This can, of course, be combined with a separate measurement relating to the vertical direction, such as weighing the object (e.g. with a separate weighing device).

A coupling can be advantageous in that the measurement of the object with the distance measuring device for determining the projection is only initiated when the stop sensor indicates proper positioning of the object in the arrangement region. In the case of the lifting device with fork carriage, the contactless measurement of the object can therefore be enabled or initiated, for example, when the object is in contact with the fork carriage. This can, for example, simplify the correct geometric assignment of the segments during evaluation (e.g. the assignment of “front” and “rear” pallet feet). Furthermore, the risk of the object slipping later can also be reduced, for example.

According to a preferred embodiment, as already mentioned, the means of transport is set up for executing a method disclosed herein, i.e. for adaptation of the safety zone, preferably also for segment-by-segment detection of “free”/“occupied”. It is therefore equipped with a corresponding computer unit or units, which can also (partially) be part of an integrated safety laser scanner, see above in detail.

The invention also relates to a goods logistics device with shelves, which are provided for storing objects, and a means of transport disclosed herein, in particular an industrial truck, preferably an autonomous forklift truck. It can move, for example, on a surface of the goods logistics device, on which, for example, the shelves can also be positioned, between the latter and a transfer point at which the means of transport/forklift truck receives goods for placement on the shelves and/or delivers objects retrieved from the shelves.

In the following, the invention is explained in more detail by means of an exemplary embodiment, whereby the individual features within the scope of the subsidiary claims can also be relevant in other combinations and no further distinction is made in detail between the different claim categories.

DETAILED DESCRIPTION OF THE PREFERRED EMBODIMENTS

Figure 1:
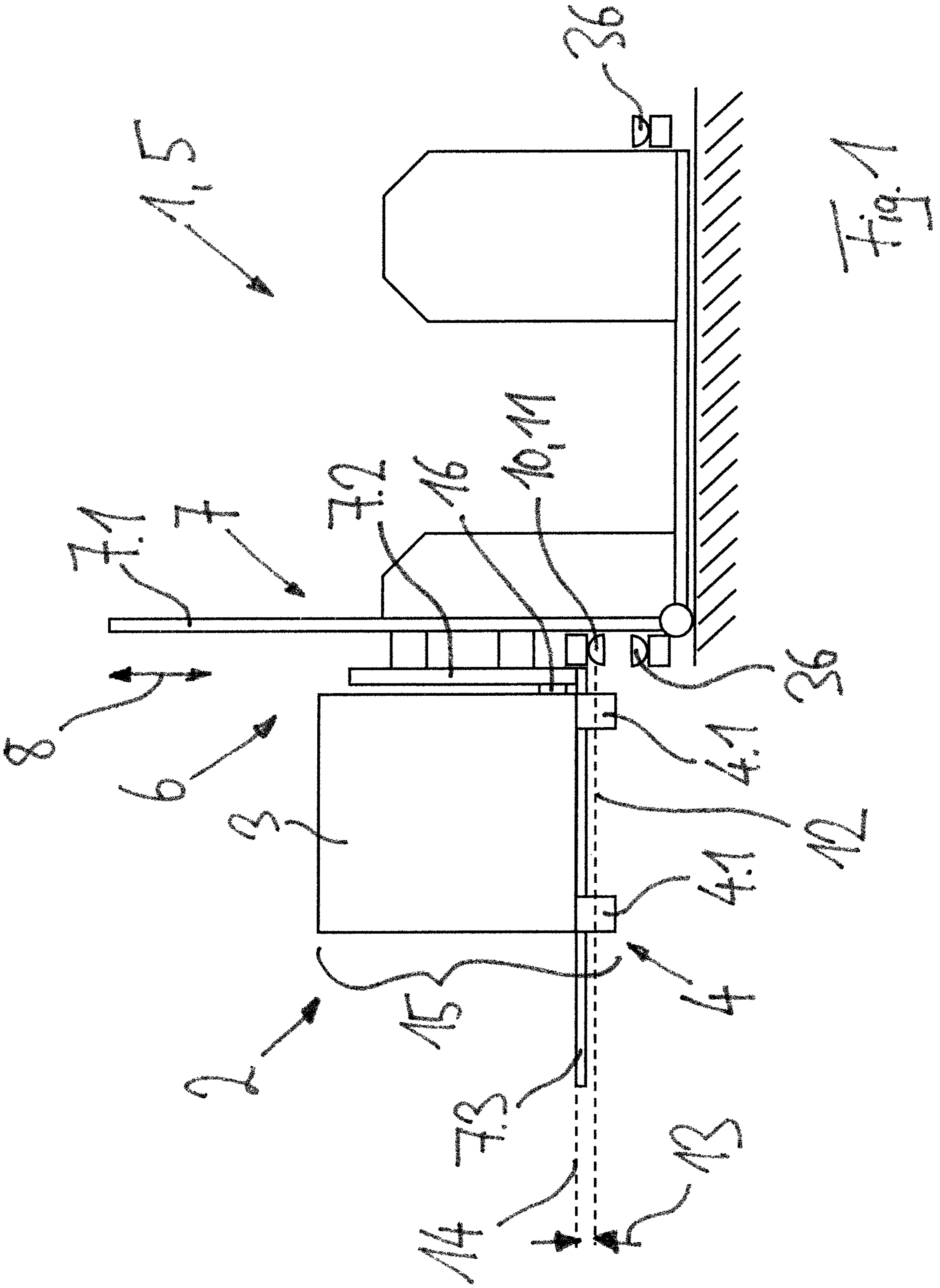
FIG. 1 shows a schematic side view of a means of transport with a distance measuring device and a picked-up object.

FIG. 1 shows a means of transport 1 for transporting an object 2, which in this case is a product 3 on a pallet 4. In this example, the means of transport 1 is designed as an autonomous forklift truck 5, and a transport device 6 of the means of transport 1 is equipped with a lifting device 7 for lifting the object 2. Specifically, the lifting device 7 comprises a mast 7.1, on which a fork carriage 7.2 is vertically displaceably guided. The latter carries fork arms 7.3, which are inserted between feet 4.1 of the pallet 4 to lift the object 2. The fork carriage 7.2 with the fork arms 7.3 can be moved to different height positions 8 on the mast 7.1.

The means of transport 1 also has a distance measuring device 10, which in this case is designed as a safety laser scanner 11. Its scanning plane 12 is arranged below the forks 7.3, namely at a vertical distance 13 of around 6 cm below a plane 14 spanned by the forks 7.3. The distance measuring device 10 is fixed in position relative to the fork carriage 7.2 and the forks 7.3, i.e. it is moved up or down together with them when the height is adjusted. The object 3 is placed for transport in an arrangement region 15 of the transport device 7, which in this case is defined by the fork carriage 7.2 and the fork arms 7.3. The correct positioning of the object 3 can be determined via a stop sensor 16.

Figure 2:
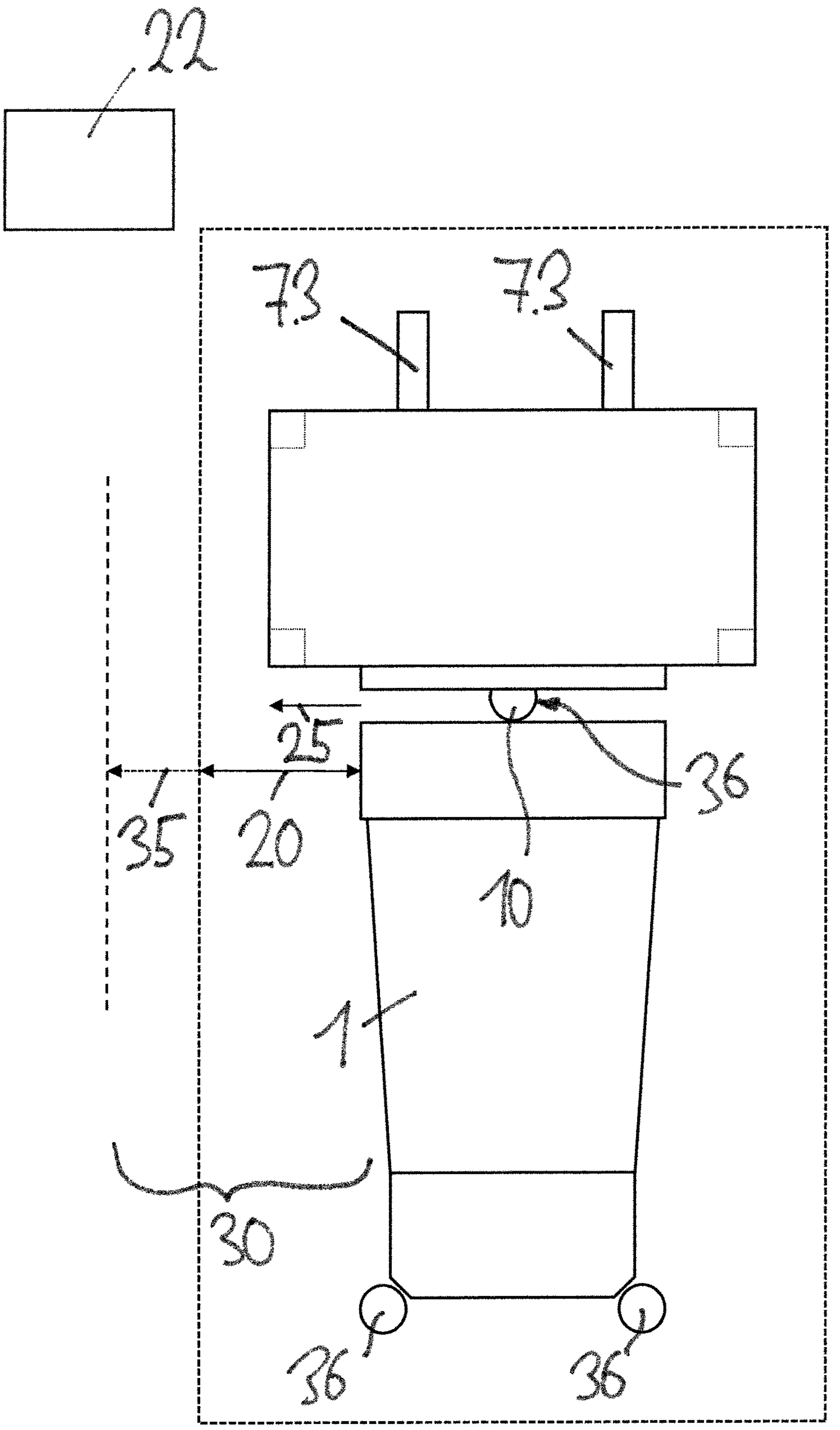
FIG. 2 shows a schematic top view of FIG. 1, illustrating a contactless measurement of the object and adaptation of a safety zone.

FIG. 2 shows a top view of the means of transport 1 with the object 2. The means of transport 1 is designed to move autonomously, and an original safety zone 20 is defined around the means of transport 1. This specifies a safety distance which one must not fall below, for example when navigating within a goods logistics system 21, and which is therefore always maintained in relation to objects 22. As can be seen from the schematic view, the object 2 has a projection 25 relative to the means of transport 1, so the original safety zone 20 would be too small when the object 2 is being transported. On the other hand, the safety distances would be too large if the maximum possible dimensions of the goods were always taken as a basis. For this reason, the object 2 is measured contactless with the distance measuring device 10 and a safety zone 30 is determined by adding a projection 35 to the original safety zone 20. To safeguard the safety zone 30 during the travel, three separate travelling laser scanners 36 are provided on the means of transport 1 in this example, see also in combination with FIG. 1.

Figure 3:
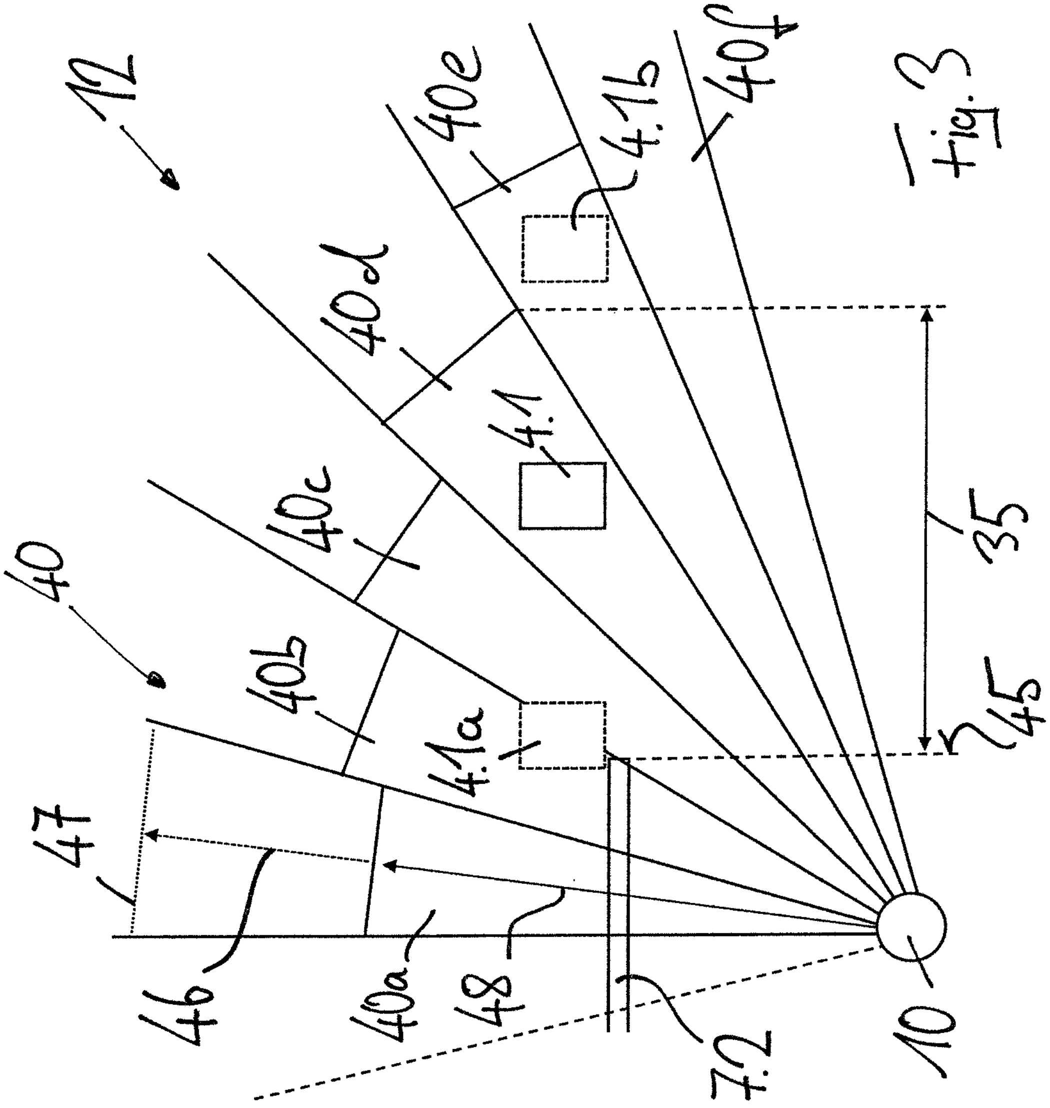
FIG. 3 shows a segmented scan field of the distance measuring device to illustrate the procedure for measuring according to FIG. 2.

FIG. 3 illustrates the determination of the projection 35 in detail, a scanning area 40 of the distance measuring device 10 is shown in top view. This is subdivided into several segments 40*a-f*, wherein for the sake of clarity only one half of the scanning area 40 is shown segmented in detail, but the other half (on the left in the figure) is structured in mirror symmetry in the present example. The fork carriage 7.2 is shown for orientation purposes, and a foot 4.1 of the pallet 4 can be seen in front of it or above it in the figure.

This is located in segment 40*d*, but does not extend into segment 40*e*. A "free" state is determined for segments 40*a-c, e, f*, but an "occupied" state is determined for segment 40*d*. The projection 35 is determined for this occupied segment 40*d*, based on its maximum lateral extension. The projection 35 in relation to the means of transport 1, specifically its outer edge 45, is therefore slightly larger than it would be if the foot 4.1 or object 2 were measured exactly, but on the other hand the reliability of this measurement is increased, see the description above in detail. For illustration purposes, two further pallet feet are also shown with dashed lines, namely for a smaller pallet (4.1*a*) and a larger pallet (4.1*b*). In the case of the smaller pallet, segments 40*b, c* would be occupied, so segment 40*c* would be used as the basis for determining the projection. In the case of the larger pallet, segment 40*e* would be occupied, the remaining segments 40*a-d* and 40*f* would be free, and the projection would be determined on the basis of segment 40*e*.

The scanning area 40 lies in the scanning plane 12, wherein the segments 40*a-f* are dimensioned smaller than a range 47, i.e. in a respective direction 46 an extension 48 is smaller than the respective maximum possible range 47.

Figure 4:
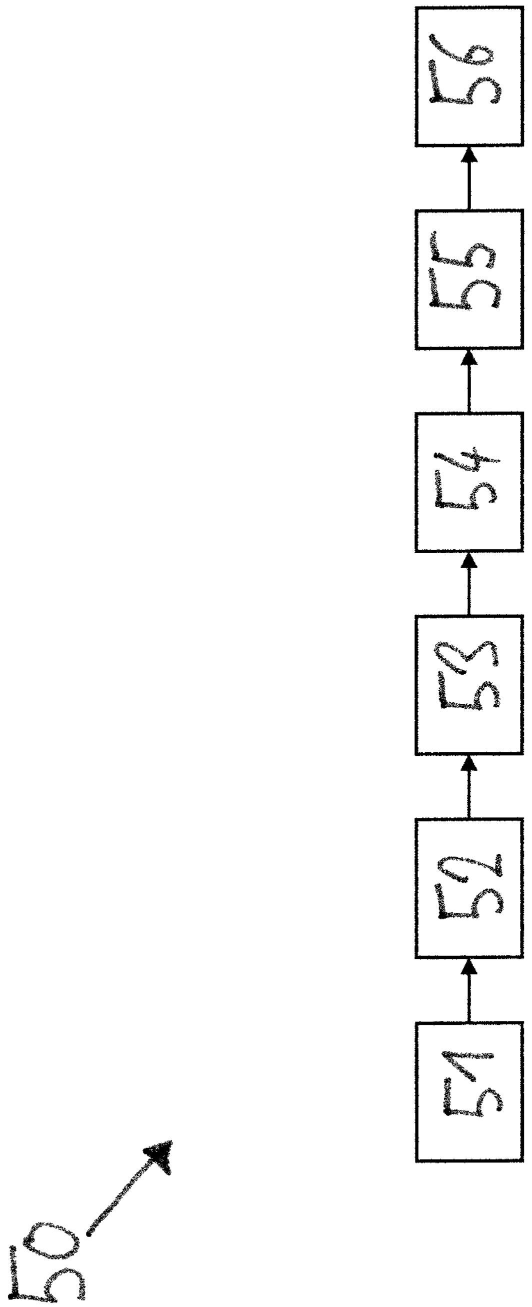
FIG. 4 shows a flow chart summarising some of the process steps.

FIG. 4 summarizes some of the process steps in a flow chart 50. The object 2 is arranged in the arrangement region 15 of the transport device 7 51, the correct positioning being determined by a stop sensor measurement 52 of the stop sensor 16. The object 2 is then measured with the distance measuring device 10 53 and a respective "free" or "occupied" state is determined for the respective segments 40*a-f* 54. For an occupied segment, a projection 35 is determined 55, which is then added to the original safety zone 20 56.

The invention claimed is:

1. A method for operating a means of transport which is equipped with a transport device for transporting an object, comprising the steps of:

i) arranging an object in an arrangement region of the transport device;

ii) contactless measuring of the object with a distance measuring device;

iii) determining a safety zone at the means of transport in dependance of the measurement according to step ii);

wherein during the measurement in step ii), a scanning area divided into a plurality of segments is detected with the distance measuring device, wherein a "free" or "occupied" state is determined for each of the segments, and wherein for a segment for which the "occupied" state has been determined, a projection is determined which this segment has relative to the means of transport, wherein the projection is added to an original safety zone in step iii) to safeguard said safety zone during travel of the means of transport.

2. The method according to claim 1, wherein an extension of the scanning area taken in a respective direction from the distance measuring device is at most 50% of a range of the distance measuring device taken in the respective direction.

3. The method according to claim 1, wherein an average extension of the scanning area taken from the distance measuring device is at most 2 meters.

4. The method according to claim 1, wherein the scanning area is divided into a total of at most 512 segments.

5. The method according to claim 1, wherein the segments are sectors of a circle concentrically located at the distance measuring device.

6. The method according to claim 5, in which the sectors of a circle have at least partially different radii.

7. The method according to claim 1, wherein the distance measuring device is a safety laser scanner with an integrated computer unit, wherein the determination of the state "free" or "occupied" takes place in the integrated computer unit.

8. A means of transport comprising:

a transport device with an arrangement region in which an object can be arranged for transport purposes; and a distance measuring device configured for contactless distance measurement, namely for detecting a scanning area, wherein the distance measuring device is arranged and orientated such that the scanning area intersects the arrangement region, and wherein the means of transport is configured to adapt a safety zone on the means of transport in dependance of a measurement of the scanning area, wherein the scanning area is divided into a plurality of segments, and wherein the means of transport is configured to determine a "free" or "occupied" state for each of the segments when measuring the scanning area with the distance measuring device, and is configured to determine a projection for a segment for which the "occupied" state has been determined, which projection this segment has relative to the means of transport, and to add the projection to an original safety zone.

9. The means of transport according to claim 8, in which the transport device comprises a lifting device, with which the arrangement region can be adjusted to different height positions, wherein the distance measuring device is also arranged at the lifting device and is brought into the different height positions with the arrangement region.

10. The means of transport according to claim 8, in which the transport device has fork arms for picking up a pallet, the distance measuring device being arranged and orientated in such a way that the scanning area lies below a plane spanned by the fork arms.

11. The means of transport according to claim 10, wherein the scanning area is located at a vertical distance of at most 8 cm below the plane.

12. The means of transport according to claim 8, wherein the transport device comprises a stop sensor with which it is measurable whether the object is arranged in the arrangement region, wherein the means of transport is configured to cause the scanning area to be detected in dependance of a stop sensor measurement.

13. The means of transport according to claim 8, configured for a method according to claim 1.

14. A goods logistics device with shelves for storing objects and a means of transport according to claim 8.

* * * * *